United States Patent
Yasuda et al.

(10) Patent No.: US 8,030,865 B2
(45) Date of Patent: Oct. 4, 2011

(54) BRUSHLESS DC MOTOR AND IMAGE PICKUP APPARATUS

(75) Inventors: Hiromu Yasuda, Kawasaki (JP); Kousuke Kiyamura, Kawasaki (JP); Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 12/362,537

(22) Filed: Jan. 30, 2009

(65) Prior Publication Data
US 2009/0200972 A1   Aug. 13, 2009

(30) Foreign Application Priority Data
Feb. 8, 2008   (JP) ................... 2008-029578

(51) Int. Cl.
*H02P 6/16* (2006.01)
*G02B 7/02* (2006.01)

(52) U.S. Cl. .............. 318/400.07; 318/400.14; 318/565; 359/824

(58) Field of Classification Search ............. 318/400.07, 318/400.14, 565; 359/824
See application file for complete search history.

(56) References Cited

U.S. PATENT DOCUMENTS
| 7,436,139 B2 | 10/2008 | Maslov et al. | |
| 2004/0061470 A1* | 4/2004 | Ito et al. | 318/565 |
| 2004/0145330 A1 | 7/2004 | Maslov et al. | |

FOREIGN PATENT DOCUMENTS
| CN | 1754305 A | 3/2006 |
| JP | 06-067259 | 3/1994 |
| KR | 100643168 B1 | 10/2006 |

OTHER PUBLICATIONS

The above references were cited in a Sep. 3, 2010 Chinese Office Action, a copy of which is enclosed with English Translation, that issued in Chinese Patent Application No. 200910005597.8.

The above reference was cited in a Nov. 10, 2010 Korean Office Action, a copy of which is enclosed without an English Translation, that issued in Korean Patent Application No. 10-2009-0007847.

* cited by examiner

*Primary Examiner* — Paul Ip
(74) *Attorney, Agent, or Firm* — Cowan, Liebowitz & Latman, P.C.

(57) ABSTRACT

A brushless DC motor configured to drive a driven member includes a rotor having a magnet, a stator having a coil configured to provide a rotational force to the magnet, a position detector configured to output a first signal that is periodic, in accordance with a rotating position of the rotor, a signal generator configured to generate a second signal by adding a lead angle to a phase of the first signal output from the position detector, an excitation switch configured to select an excitation to the coil in accordance with the second signal, and a phase change part configured to change the lead angle in accordance with at least one of a position and a moving direction of the driven member.

5 Claims, 7 Drawing Sheets

| LENS POSITION | MOVING DIRECTION | LEAD ANGLE |
|---|---|---|
| 4~8 | POSITIVE | 80° |
| 0~4 | POSITIVE | 60° |
| 0~6 | NEGATIVE | 40° |
| 6~8 | NEGATIVE | 20° | ized to linearly drive a lens according to a first embodiment.
BRUSHLESS DC MOTOR AND IMAGE PICKUP APPARATUS

BACKGROUND OF THE INVENTION

1. Field of the Invention

The present invention relates to a brushless DC motor and an image pickup apparatus.

2. Description of the Related Art

It is conventionally known to apply a brushless DC motor that uses a coil for a stator and a magnet for a rotor, to a driving apparatus of a camera lens. See Japanese Patent Publication No. 06-67259. The brushless DC motor detects a position of the rotor through a sensor, and advantageously prevents stepping out by maintaining synchronization between a command signal and the position of the rotor.

Characteristically, a speed of the brushless DC motor depends upon a load. For a lens driving apparatus, the load fluctuates depending upon a position and a moving direction of the driving apparatus due to an unsteadiness-removing biased spring and a change of an inclination of an angle-of-view controlling cam groove. Therefore, a driving apparatus that uses the brushless DC motor changes its speed in driving a lens, and causes a user to feel uncomfortable.

SUMMARY OF THE INVENTION

The present invention provides a brushless DC motor that can reduce a speed fluctuation of a driven member even when the load fluctuates, with a comparatively simple configuration.

A brushless DC motor according to one aspect of the present invention configured to drive a driven member includes a rotor having a magnet, a stator having a coil configured to provide a rotational force to the magnet, a position detector configured to output a first signal that is periodic, in accordance with a rotating position of the rotor, a signal generator configured to generate a second signal by adding a lead angle to a phase of the first signal output from the position detector, an excitation switch configured to select an excitation to the coil in accordance with the second signal, and a phase change part configured to change the lead angle in accordance with at least one of a position and a moving direction of the driven member.

Further features of the present invention will become apparent from the following description of exemplary embodiments with reference to the attached drawings.

DESCRIPTION OF THE EMBODIMENTS

Referring now to the accompanying drawings, a description will be given of a brushless DC motor according to the present invention.

First Embodiment

Figure 1:
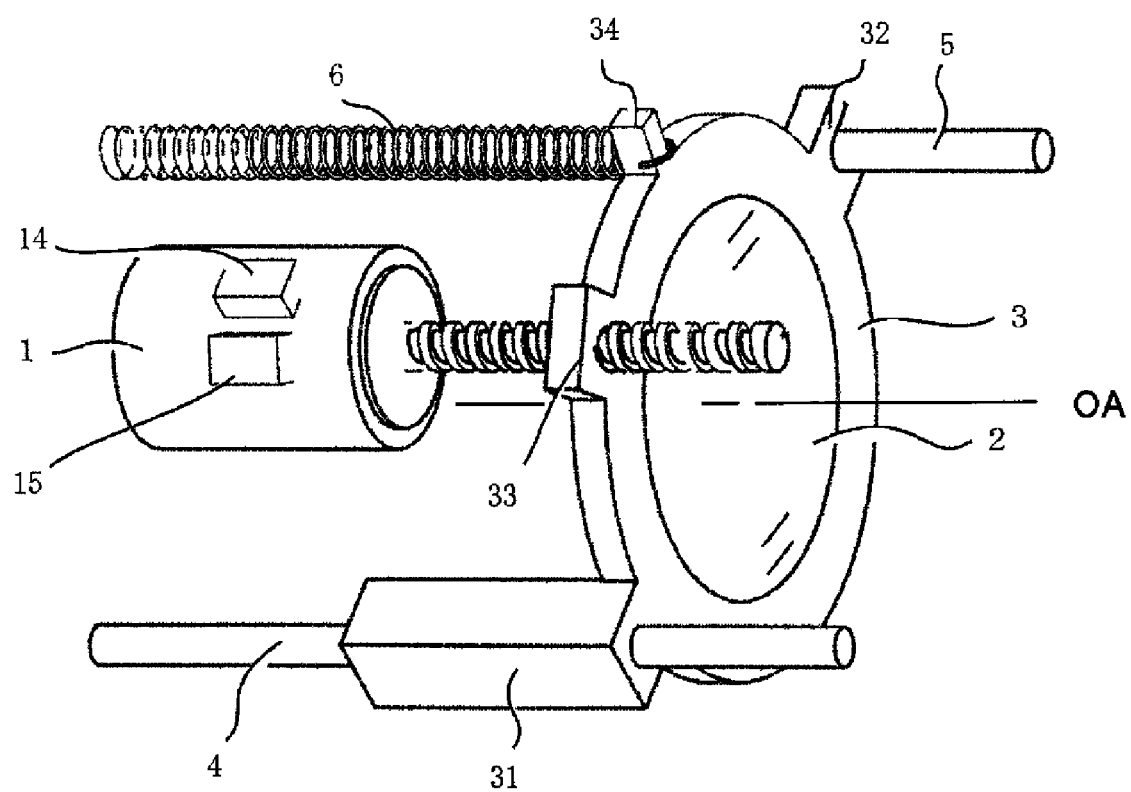
FIG. 1 is a perspective view of a driving apparatus configured to linearly drive a lens according to a first embodiment.

FIG. 1 is a perspective view of a driving apparatus 50 according to the first embodiment. The driving apparatus 50 includes a brushless DC motor 1, guide bars 4 and 5, and a spring 6, and drives a lens 2 and a lens holder 3 which serve as a driven member.

The brushless DC motor 1 is fixed onto a base plate (not shown). An output axis of the motor 1 is male-threaded. A detailed structure of the motor 1 will be described later.

The lens 2 is fixed onto the lens holder 3. The lens holder 3 has a sleeve part 31, a rotation preventive part 32, a female-threaded part 33, and a spring hook part 34. The sleeve part 31 has a hollow rectangular-parallelepiped shape, and extends parallel to an optical axis OA. The guide bar 4 is inserted into the hollow of the sleeve part 31, and the sleeve part 31 slides along the guide bar 4. The sleeve part 31 in the longitudinal direction is longer than the thickness of the lens holder 3. As a result, the lens holder 3 moves in the optical-axis direction, and is prevented from inclining relative to the optical axis OA. The rotation preventive part 32 has a hollow rectangular-parallelepiped shape, and extends parallel to the optical axis. The guide bar 5 is inserted into the hollow of the rotation preventive part 32, and the rotation preventive part 32 slides along the guide bar 5. The rotation preventing part 32 in the longitudinal direction is as long as the thickness of the lens holder 3. The sleeve part 31 and the rotation preventive part 32 are arranged symmetrical with respect to the optical axis OA. The rotation preventive part 32 prevents a rotation of the lens holder 3 around the guide bar 4 as a center. The female-threaded part 33 is engaged with a male-thread provided to the motor 1. Thereby, every one rotation of the motor, the lens holder 3 can be moved straight by one pitch of the thread.

The guide bars 4 and 5 are arranged parallel to the optical-axis direction of the lens 2 and fixed onto the base plate by a method (not shown), and support the lens holder 3 so that the lens holder 3 can move straight. The spring 6 is a tension spring, one end of which is engaged with the spring hook part 34 of the lens holder 3, and the other end of which is engaged with the base plate (not shown).

The above structure can convert a rotational motion of the brushless DC motor 1 into the forward movement of the lens 2 and the lens holder 3, and enables the lens 2 to move in the optical-axis direction relative of the base plate. The focus and the angle of view of the lens 2 can be controlled by moving the lens 2 in the optical-axis direction. In addition, by always forcing the lens holder 3 in one direction through the spring 6, an error caused by the unsteadiness of the thread can be eliminated and the position of the lens 2 can be stably determined in the optical-axis direction.

Figure 2:
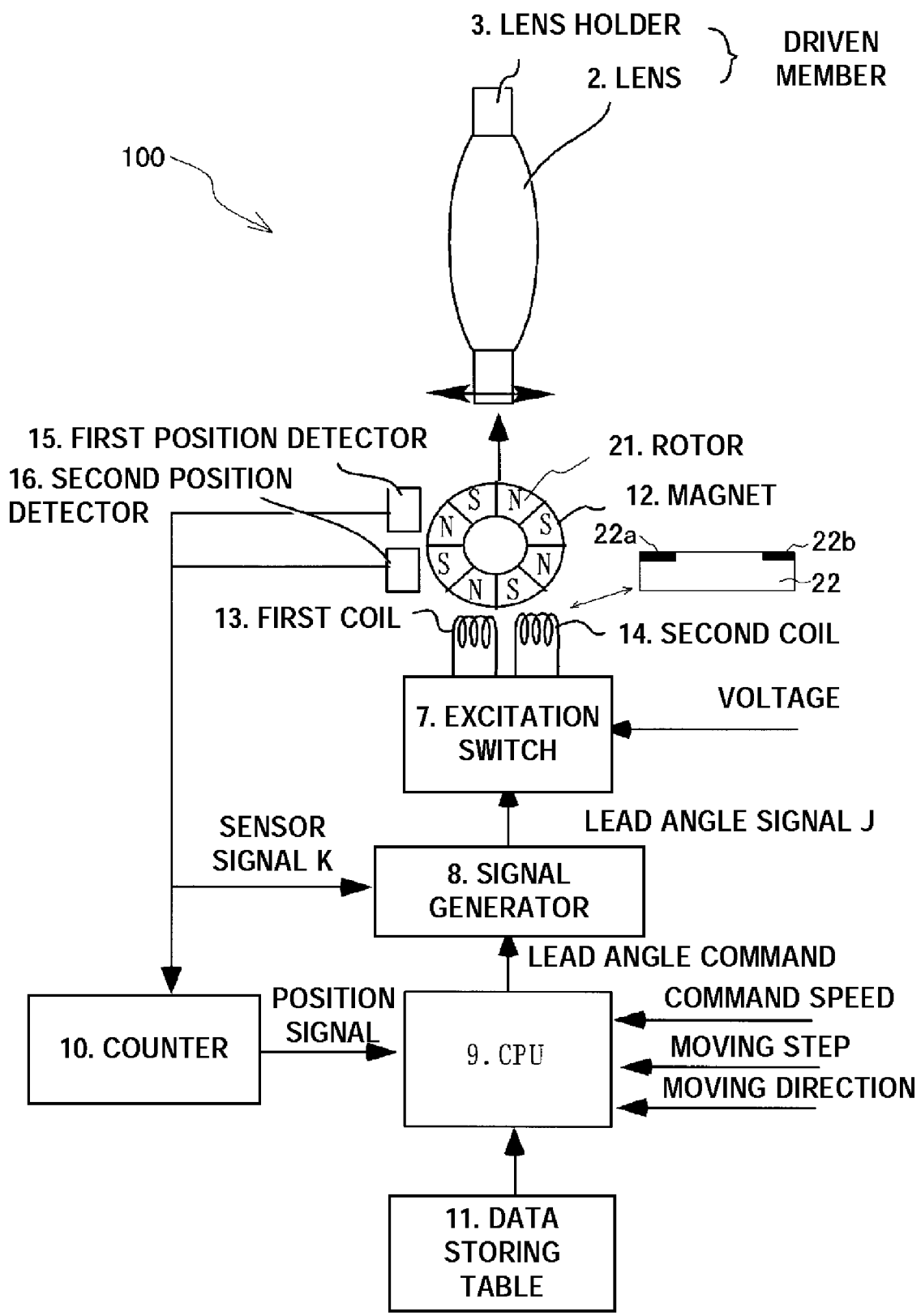
FIG. 2 is a block diagram of a digital camera (image pickup apparatus) according to the first embodiment.

FIG. 2 is a block diagram of a digital camera (image pickup apparatus) 100. The brushless DC motor 1 drives the lens 2 and the lens holder 3 which serve as a driven member. The brushless DC motor 1 includes a rotor 21, a stator 22, a first position detector 15, a second position detector 16, a signal generator 8, an excitation switch 7, and a phase change part.

The brushless DC motor 1 may be an outer rotor type in which the rotor 21 is located outside the stator 22, or an inner rotor type in which the rotor 21 is located inside the stator 22. The number of phases may be two, three or another number.

The rotor 21 has a magnet 12. The stator 22 provides a rotational force to the magnet 12, and has first and second magnetic pole parts 22a and 22b, a first coil 13 and a second coil 14, which provide a rotational force to the magnet 12. The magnet 12 is rotatably supported on the magnetic pole parts 22a and 22b. The magnet 12 is divided into n parts in the circumferential direction, and alternately magnetized with S poles and N poles. The magnetization is provided such that the strength of the magnetic flux density in the radial direction becomes approximately sinusoidal relative to the rotating direction. The first and second magnetic poles 22a and 22b are schematically shown in FIG. 2, and are opposite to a magnetized surface of the magnet 12. The first and second magnetic poles 22a and 22b are arranged with a predetermined phase difference, and can provide a rotational force to the magnet 12 when alternately excited by the first and second coils 13 and 14. The first coil 13 is fixed onto the stator 22, and can excite the first magnetic pole 22a when electrified. The second coil 14 is fixed onto the stator 22, and can excite the second magnetic pole 22b when electrified.

The first position detector 15 and the second position detector 16 are sensors, such as a Hall element and an MR device, configured to read a magnetic field, and serve as a position detector configured to output a periodic sensor signal (first signal) K in accordance with a rotating position of the rotor 21. In this embodiment, the first position detector 15 and the second position detector 16 output voltages in accordance with the strength of the magnetic field, are located near the magnetized surface of the magnet 12, and measure the magnetic poles of the opposite magnet 12. When the magnetization is provided such that the magnetic flux distribution of the magnet is sinusoidal relative to the rotating angle, a sine wave output is obtained from the first position detector 15 whenever the rotor 21 rotates by 360/n°. In addition, by shifting the second position detector 16 from the first position detector 15 by 90/n°, a cosine wave output is obtained from the second position detector 16.

The motor driving circuit of this embodiment includes, as shown in FIG. 2, an excitation switch 7, a signal generator 8, a CPU 9, a counter 10, and a data storing table (memory) 11.

The excitation switch 7 can flow the current in the predetermined direction in each of the first coil 13 and the second coil 14, and switches the excitation to the coil 13 and the excitation to the coil 14 in accordance with a lead angle signal (second signal) J from the signal generator 8. In other words, the current switching timing is timing at which the lead angle signal is received.

The signal generator 8 can generate a lead angle signal (second signal) J that puts forward the phase by an amount of the lead angle instructed by the CPU 9, from the sensor signals K output from the first and second position detectors 15 and 16. A description will be given later of a more specific generation method of a lead angle signal. This lead angle signal J determines the electrization switching timing to the excitation switch 7.

The CPU 9 instructs to drive and stop the brushless DC motor 1 in response to the external instruction regarding a command speed, a moving step, and a moving direction. In addition, the CPU 9 sends a lead angle command to the signal generator 8. A command value of the lead angle is determined by referring to the data storing table 11 and a value of the position signal from the counter 10. A more specific determination method of the lead angle command will be described later.

The counter 10 counts the sensor signal K obtained from the first position detector 15 and the second position detector 16, and outputs a relative moving distance of the lens 2 and the lens holder 3 which serve as a driven member.

This embodiment detects whether the driven member is located at an initial position through an initial position detector (not shown), and drives the driven member to the initial position when the power is projected. The counter 10 counts the sensor signal K since that time so as to recognize a moving amount from the initial position of the driven member. In other words, an output of the counter 10 becomes a position signal of the driven member.

The data storing table 11 stores data that determines a lead angle α. More specifically, the data storing table 11 stores a relationship shown in FIG. 7 between at least one of the position and the moving direction of the driven member and the load for driving the driven member, and a relationship shown in FIG. 5 among the load, a target speed used to drive the driven member, and a plurality of lead angles. This embodiment combines the CPU 9, the counter 10, the data storing table 11 with one another and forms the phase change part. The phase change part changes a lead angle in accordance with at least one of the position and moving direction of the driven member. Alternatively, the phase change part changes a lead angle in accordance with the load used to drive the driven member.

Figure 3:
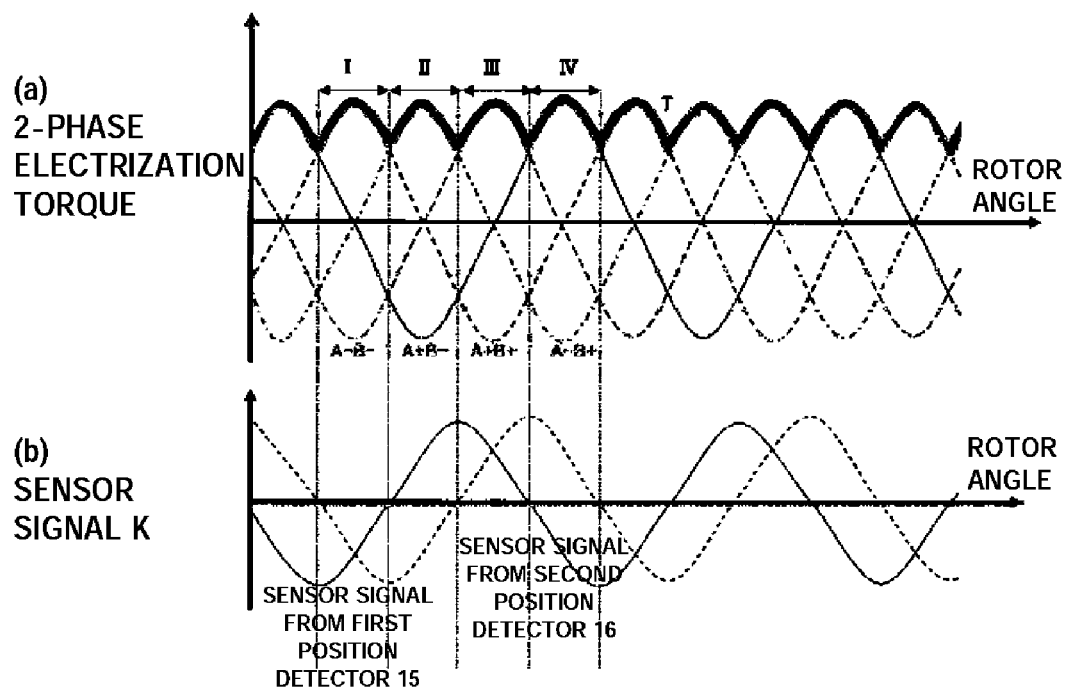
FIG. 3 shows a torque diagram and a sensor signal so as to explain a driving principle.

Referring now to FIG. 3, a description will be given of a driving principle of the motor used for this embodiment. FIG. 3A is a torque distribution when the constant current is flowed in each phase of the motor 1. Since the positive and negative currents can be flowed in each of the two coils 13 and 14, four types of torque distributions shown in FIG. 3A are obtained. In FIG. 3A, A+B+ denotes a torque when the positive current is flowed in the first coil 13 and the positive current is flowed in the second coil 14. A−B+ denotes a torque when the reverse current is flowed in the first coil 13 and the positive current is flowed in the second coil 14. A−B− denotes a torque when the negative current is flowed in the first coil 13 and the negative current is flowed in the second coil 14. A+B− shows a torque when the positive current is flowed in the first coil 13 and the reverse current is flowed in the second coil 14.

In FIG. 3A, the electrization of A+B+ is provided to a region I, the electrization of A−B+ is provided to a region II, the electrization of A−B− is provided to a region III, and the electrization of A+B− is provided to a region IV. The brushless DC motor 1 draws a torque curve shown by T and provides a maximum torque at each angle when the electrization is switched at proper timings in accordance with the position of the rotor 21.

In order to obtain such a torque, the first and second position detectors 15 and 16 are arranged in place and configured to output the sensor signals K, as shown in FIG. 3B. When the sensor signal from the first position detector 15 is switched between positive and negative, the electrization direction to the first coil 13 is switched; when the sensor signal from the second position detector 16 is switched between positive and negative, the electrization direction to the second coil 14 is switched. Thereby, the torque shown by T in FIG. 3A can be obtained.

Figure 4:
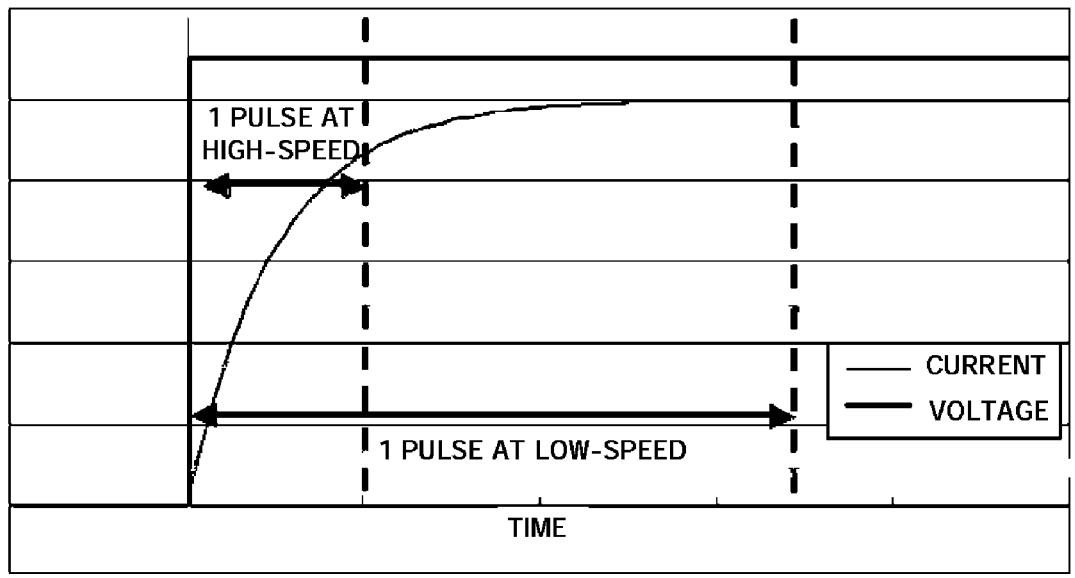
FIG. 4 is a view for explaining a delay of a leading edge of the current.

The exciting current is subject to the inductances of the coils 13 and 14, and its leading edge delays relative to the exciting voltage as shown in FIG. 4. When the number of rotations of the motor 1 is small, the influence is little and the torque shown by T can be obtained. However, as the rotor 21 rotates faster, a delay of the leading edge of the exciting current becomes conspicuous. In high-speed rotations, a phase is switched before the exciting current reaches a constant value, and the torque lowers.

Figure 5:
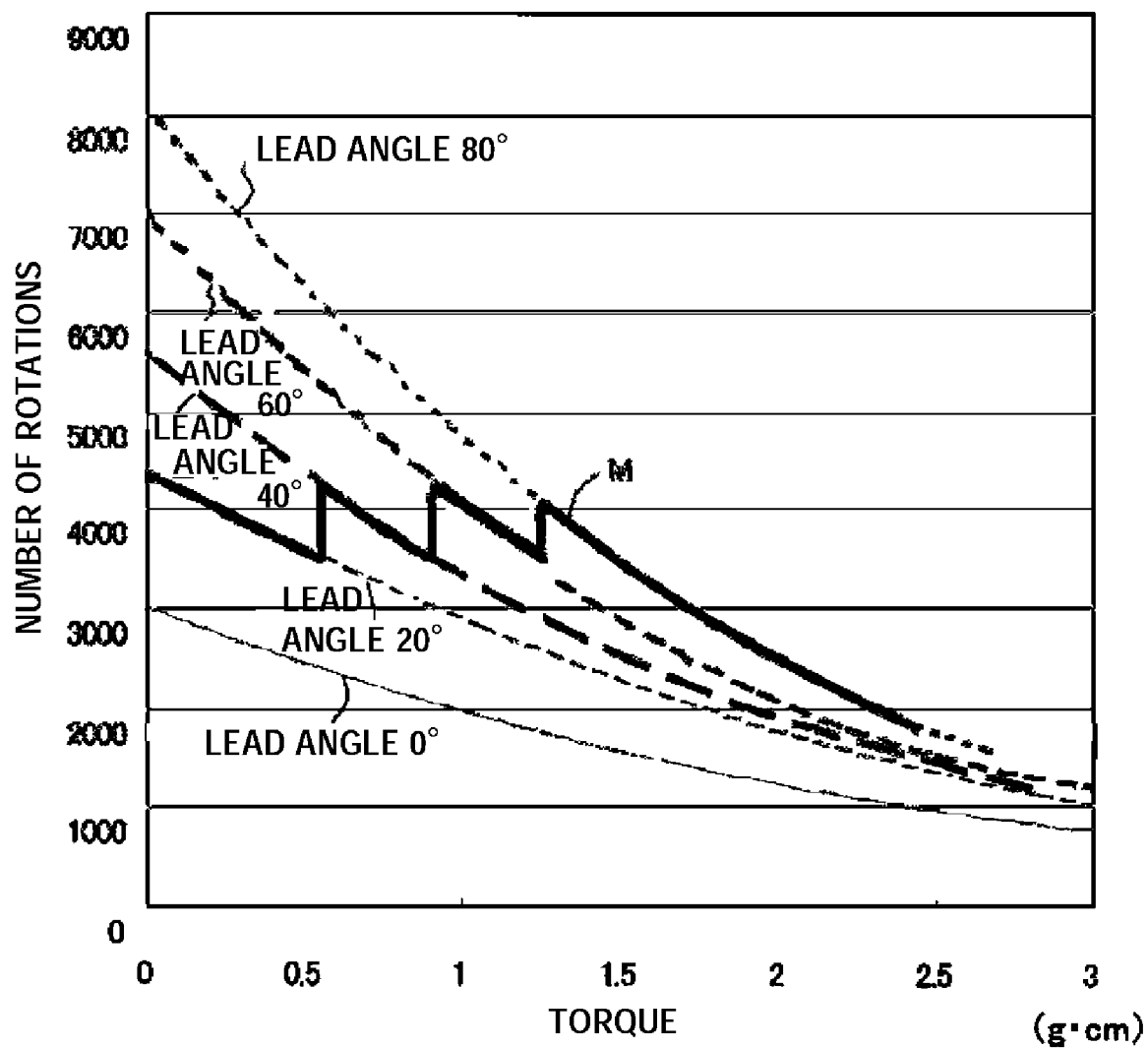
FIG. 5 is a graph for explaining a relationship between a load and a target speed for each of plural lead angles, which is stored in a data storing table shown in FIG. 2.

The following method is one solution for this problem. As the rotating speed of the rotor 21 becomes higher, a switching angle of the excitation to the coils 13 or 14 is put forward, and the coil 13 or 14 is electrified before the timing shown as T in FIG. 3A. Thereby, a delay of the leading edge of the current is cancelled and a torque becomes stable even in the high-speed rotations. This angle that puts forward the electrization will be referred to as a "lead angle" hereinafter. A characteristic of the motor 1 can be adjusted by adding the lead angle to the phase. FIG. 5 shows a relationship between the load torque and the number of rotations for different lead angles.

By utilizing the data, a fluctuation of the number of rotations of the motor 1 can be reduced by changing a lead angle with a load, even when the load to the motor 1 fluctuates. For example, the number of rotations can be maintained to be about 4,000 PPS by setting a lead angle to 20° for a load torque between 0 and 0.6 gcm, 40° for a load torque between 0.6 and 0.9 gcm, 60° for a load torque between 0.9 and 1.3 gcm, and 80° for a load torque of 1.3 gcm or higher. FIG. 5 shows the characteristic of the motor 1 as M at this time.

A description will now be given of a generation method of a lead angle signal. As described above, FIG. 3B shows waveforms output from the first position detector 15 and the second position detector 16. As described above, a first position signal having an approximately sine wave shape is obtained from the first position detector 15. In addition, the second position detector 16 is shifted from the first position detector 15 by a phase of an electric angle of 90°, and thus provides the second position signal having a cosine wave shape. An arbitrary lead angle signal can be produced based on these two signals. In producing a lead angle signal (30° in the figure) which puts forward relative to the first position detector 15 by α°, assume that a first lead angle signal is a signal given by the following equation:

First Position Signal [sin θ]×cos α+Second Position Signal [cos θ]×sin α  EQUATION 1

In addition, assume that a second lead angle signal is a signal given by the following equation:

Second Position Signal [cos θ]×cos α−First Position Signal [sin θ]×sin α  EQUATION 2

As a consequence, the first lead angle signal becomes sin(θ+α) and the second lead angle signal becomes cos(θ+α), and the sensor signal from the first position detector 15 and the sensor signal from the second position detector 16 can be provided with a lead angle of α°.

The signal generator 8 generates the first lead angle signal and the second lead angle signal. The signal generator 8 can be implemented by a circuit shown in FIG. 6. Initially, each of the sensor signals from the first position detector 15 and the second position detector 16 is amplified by A times. An inverted signal of the amplified signal is also prepared. Assume that four amplifiers on the left side in order from the top shown in FIG. 6 will be referred to as a first inverting amplifier 8a, a second inverting amplifier 8b, a third inverting amplifier 8c, and a fourth inverting amplifier 8d. The first inverting amplifier 8a is connected to the first position detector 15, amplifies the output (sin θ) of the first position detector 15 by −A times, and outputs −A sin θ. The second inverting amplifier 8b is connected to the output of the first inverting amplifier 8a, amplifies the output of the first inverting amplifier 8a by −1 times, and outputs A sin θ. The third inverting amplifier 8c is connected to the second position detector 16, amplifies the output (cos θ) of the second position detector 16 by −A times, and outputs −A cos θ. The fourth inverting amplifier 8d is connected to the output of the third inverting amplifier 8c, amplifies the output of the third inverting amplifier 8c by −1 times, and outputs A cos θ.

Figure 6:
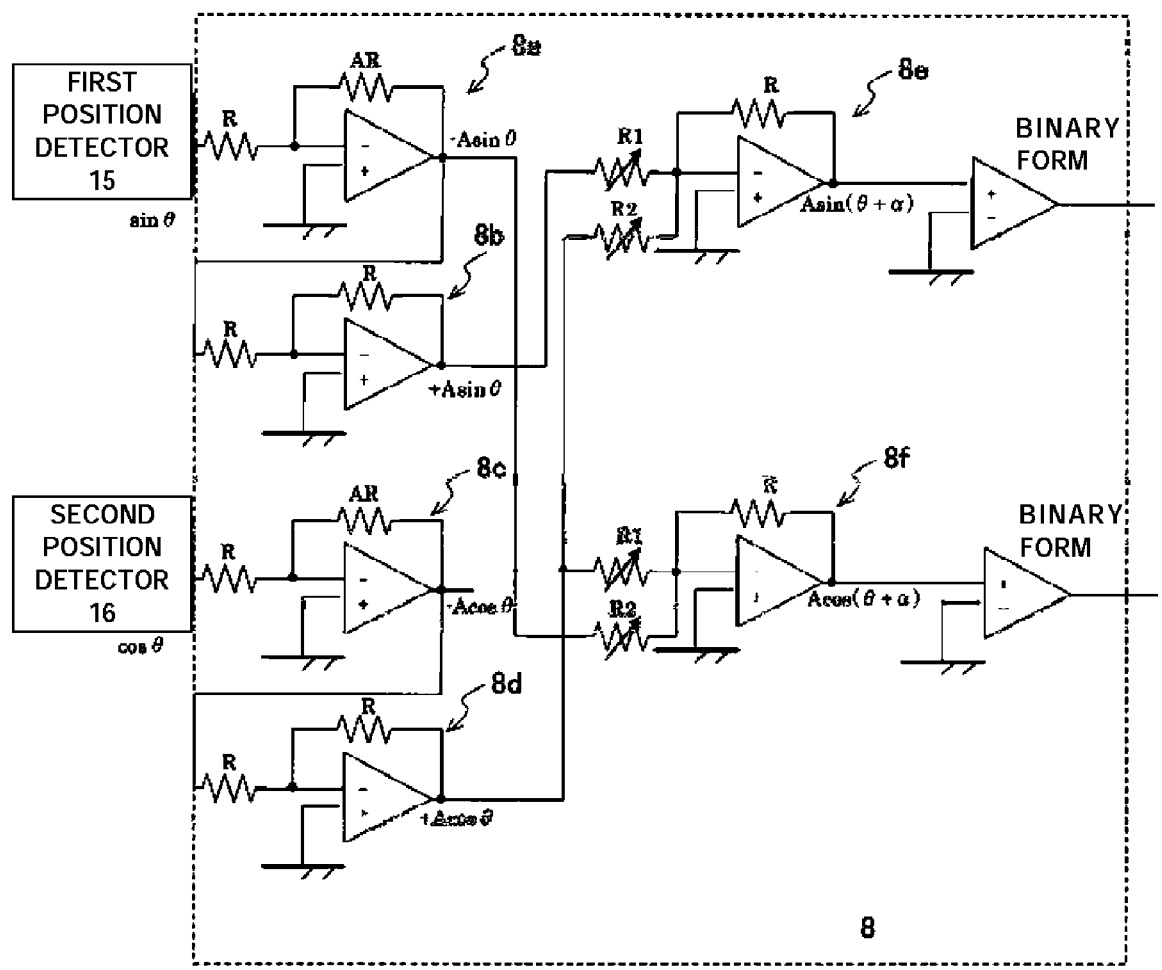
FIG. 6 is a circuitry diagram of a signal generator shown in FIG. 2.

Moreover, two inverting amplifiers at the right side in order from the top in FIG. 6 will be referred to as a fifth inverting amplifier 8e and a sixth inverting amplifier 8f. The fifth inverting amplifier 8e adds an output of the second inverting amplifier 8b amplified by R/R1 times to an output of the fourth inverting amplifier 8d amplified by R/R2 times, and generates a first lead angle signal defined by Equation 3. The sixth inverting amplifier 8f adds the output of the fourth inverting amplifier 8d amplified by R/R1 times to the output of the first inverting amplifier 8a amplified by R/R2 times, and generates a second lead angle signal defined by Equation 4. Thereby, the following equations can be obtained:

$$\text{First Lead angle Signal} = A\frac{R}{R1}\sin\theta + A\frac{R}{R2}\cos\theta \quad \text{THIRD EQUATION}$$
$$= A\sin(\theta + \alpha)$$

$$\text{Second Lead angle Signal} = A\frac{R}{R1}\cos\theta - A\frac{R}{R2}\sin\theta \quad \text{FOURTH EQUATION}$$
$$= A\cos(\theta + \alpha)$$

Amplification factors of cos α times and sin α times can be generated and a signal that puts forward by an arbitrary lead angle α can be produced by selecting values for variable resistances R1 and R2 which satisfy R/R1=cos α and R/R2=sin α. This embodiment acquires five types of motor characteristics as shown in FIG. 5 by changing the values of the variable resistances R1 and R2 so that the value of α can be changes among five types or 0°, 20°, . . . , and 80°.

The above described generation method of the lead angle signal is merely illustrative, and the present invention is not limited to this embodiment. A known method may be used to obtain a similar effect to the above generation method of the lead angle signal, for example, by using a high-resolution encoder that outputs dozens of pulsed signals whenever the rotor rotates by 360/n° and by adjusting an electrization switching pulse interval.

Figures 7, 8:
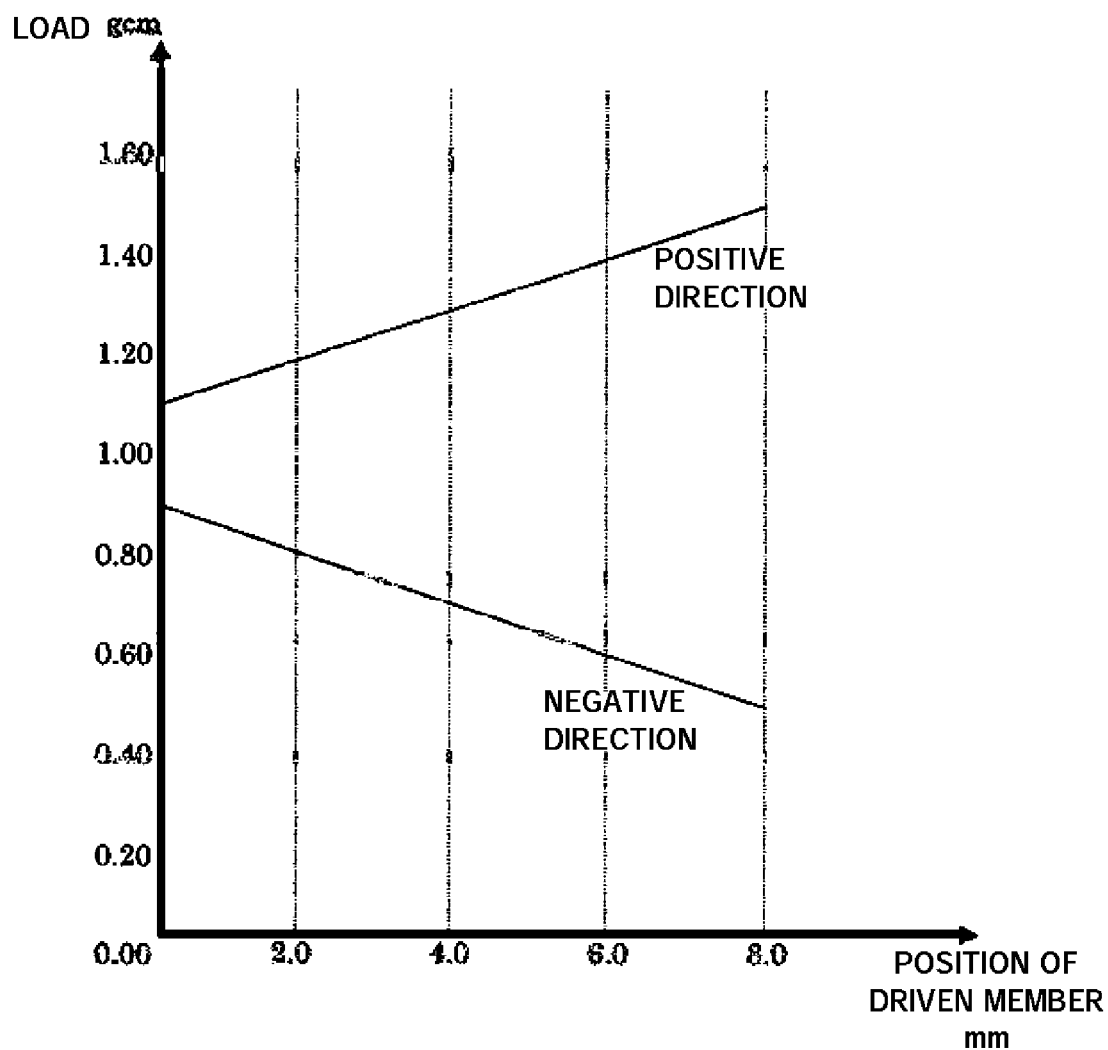
FIG. 7 is a graph for explaining a relationship between a position and a moving direction of a driven member and the load.
FIG. 8 is one example of data input to the data storing table shown in FIG. 2.

Next follows a description of a speed maintaining method in a linear driving apparatus of this embodiment. The driving apparatus 50 shown in FIG. 1 is forced at one side by the spring 6. The driving apparatus 50 receives a restoring force of the spring 6, and causes the load to fluctuate as shown in FIG. 7 depending upon the position and moving direction of a driven member.

This embodiment can detect a position of the driven member using an output from the counter 10, and can detect a moving direction of the driven member by comparing the command position with the current position. Therefore, the current load can be determined by referring to the load data of FIG. 7. Once the load and the target speed are determined, the lead angle for outputting the target speed can be determined by referring to the T-N diagram for each lead angle shown in FIG. 5. In other words, the CPU 9 serves as a selector that selects a lead angle among a plurality of lead angles which is closest to the target speed for the load corresponding to at least one of the position and the moving direction of the driven member. While this embodiment stores both the relationship shown in FIG. 5 and the relationship shown in FIG.

7, a relationship between at least one of the position and the moving direction of the driven member and the target speed may be stored, for example.

In an example, assume that the target speed is 4,000 PPS. In this case, the lead angle may be selected so as to obtain the characteristic of M shown in FIG. 5. From FIG. 7, when the position of the driven member is between 4 to 8 mm and the moving direction is a positive direction, the load applied to the motor becomes 1.3 to 1.5 gcm and thus the lead angle is set to 80°. When the position of the driven member is between 0 to 4 mm and the moving direction is a positive direction, the load applied to the motor becomes 1.1 to 1.3 gcm and thus the lead angle is set to 60°. When the position of the driven member is between 0 to 6 mm and the moving direction is a negative direction, the load applied to the motor becomes 0.9 to 0.6 gcm and thus the lead angle is set to 40°. When the position of the driven member is between 6 to 8 mm and the moving direction is a negative direction, the load applied to the motor becomes 0.6 to 0.5 gcm and thus the lead angle is set to 20°.

The data storing table 11 stores correlations among the position and moving direction of the driven member and the lead angle, as described later. FIG. 8 shows one example. The CPU 9 reads a lead angle for achieving a target speed by referring to the data storing table 11 based on the current position and the moving direction of the driven member. The CPU 9 sends the read lead angle to the signal generator 8. The motor can be moved at a target speed by driving the motor in accordance with the lead angle signal.

This embodiment can reduce the speed fluctuation of the driven member even when the load to the motor 1 fluctuates, because this embodiment changes a lead angle in accordance with the position and the moving direction of the driven member. As a result, a user is less likely to feel uncomfortable during manipulations of the camera 100. For example, when the lead angle is fixed to 60°, the number of rotations of the motor becomes 5,500 PPS when the load becomes minimum (with the position of the driven member of 8.0 mm, the moving direction of the negative direction, and the load of 0.5 gcm). When the load becomes maximum, the number of rotations of the motor becomes 3,000 PPS (with the position of the driven member of 8.0 mm, the moving direction of the positive direction, and the load of 1.5 gcm). Therefore, the speed fluctuation becomes double depending upon the position and the moving direction. On the other hand, this embodiment changes the lead angle in accordance with the position and the moving direction of the driven member, and can maintain the characteristic of the motor to be M shown in FIG. 7. Thereby, the minimum number of rotations of the motor is 3,700 PPS, and the maximum number of rotations of the motor is 4,400 PPS, and the speed fluctuation can be reduced. While this embodiment changes the lead angle at 20° intervals, the motor's speed fluctuation can be further reduced when the data storing table stores more data and the lead angle is changed at finer pitches.

In addition, since a simple method of reading the position of the driven member from the counter 10 and of referring to the table 11 based on the value can reduce the speed fluctuation and simplify the process, the circuit becomes simple and the load to the circuit is reduced.

Second Embodiment

Figure 9:
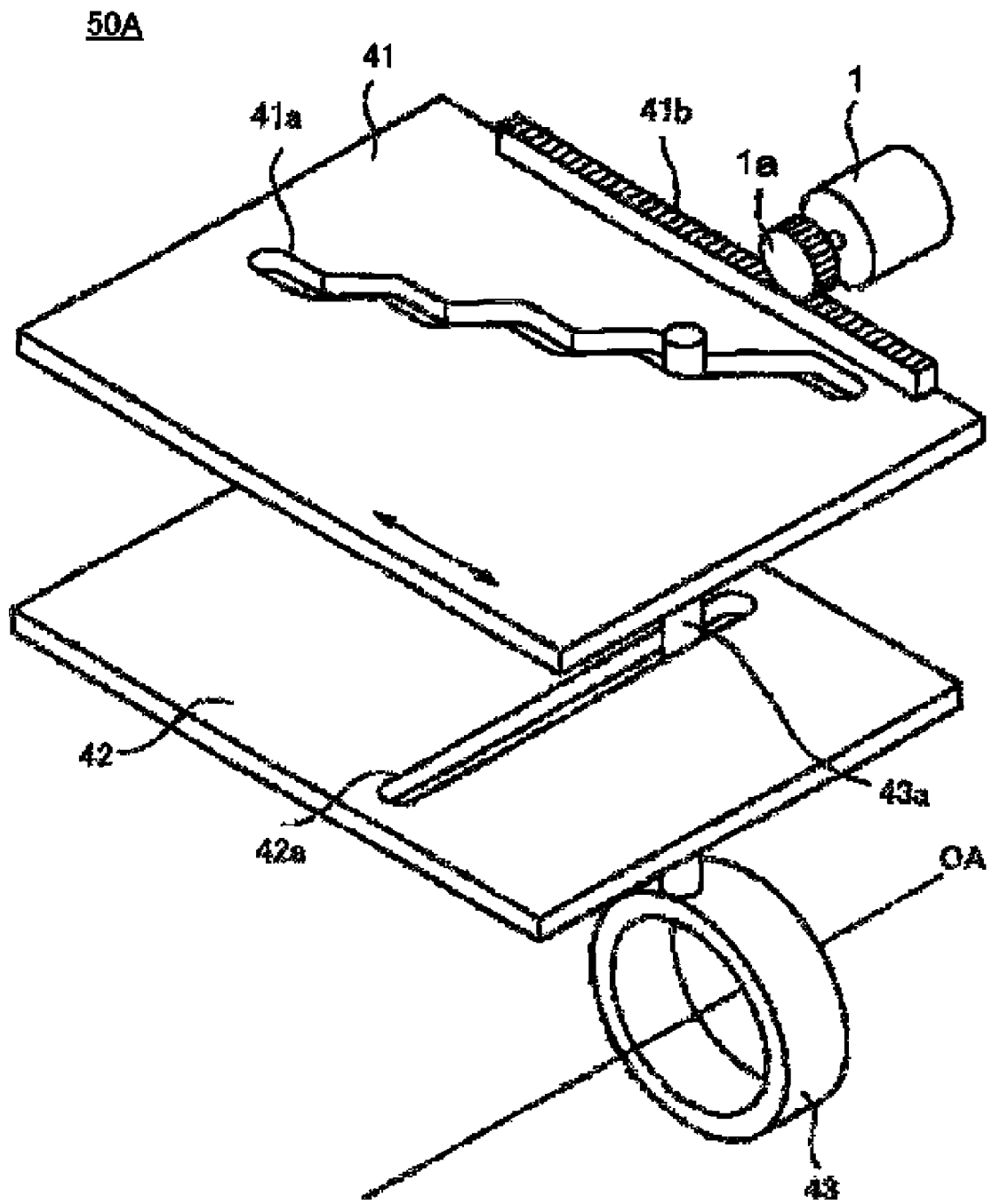
FIG. 9 is a partially perspective view of a driving apparatus according to a second embodiment.

Referring now to FIG. 9, a description will be given of the driving apparatus 50A according to a second embodiment. The second embodiment is different from the first embodiment in a mechanism of the linear driving apparatus, and similar to the first embodiment in the structure and the driving circuit of the motor 1. The driving apparatus 50A includes the motor 1, a rotational cam cylinder 41, a fixture cylinder 42, and a driven member 43. The rotational cam cylinder 41 has a cylindrical shape, and rotatably supported on the fixture cylinder 42. FIG. 9 shows only part of the cylinder for explanation purposes.

The rotational cam cylinder 41 includes a cam groove 41a, and a pin part 43a of the driven member 43 is engaged with a cam groove 41a, and a gear part 41b engaged with a pinion gear 1a attached to the motor 1. The rotation of the motor 1 is transmitted to the rotary cam cylinder 41. The fixture cylinder 42 is fixed onto a base plate (not shown). Similar to the rotational cam cylinder 41, FIG. 9 shows only part of the cylindrical shape. The fixture cylinder 42 has a linear groove 42a that extends parallel to the optical axis OA of the driven member. Since the pin part 43a of the driven member 43 is engaged with the linear groove 42a, the driven member 43 can be linearly driven parallel to the optical axis OA, and the rotational motion of the driven member 43 can be restricted.

This structure can drive the driven member 43 in the linear direction, as the motor 1 rotates. The load applied to the motor little changes depending upon the moving direction, but it changes depending upon an inclination of the cam groove at this time or a position of the driven member. Therefore, this embodiment determines a lead angle by a position of the driven member 43, and can obtain an effect similar to the first embodiment.

Third Embodiment

The lead angle may be determined only by the moving direction of the driven member. For example, in driving the driven member parallel to the gravity direction when the driven member is not forced by the spring 6, the load applied to the motor is not affected by a position but depends only upon the moving direction. When the moving direction accords with the gravity direction, the load is small; when the moving direction is opposite to the gravity direction, the load becomes large. In this case, this embodiment can obtain an effect similar to that of the first embodiment by detecting only the moving direction and by determining the lead angle.

Fourth Embodiment

While the above embodiment detects the position of the driven member by using the counter, the position of the driven member may be directly detected by providing a linear encoder to the driven member.

In addition, while the above embodiment uses a Hall element for the position detector to detect a magnetic flux of the magnet 12 in the rotor 21, a structure of the position detector is not limited and an optical encoder may be used in which the rotor is provided with a pulse plate and the signal is detected by the photo-interrupter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-029578, filed on Feb. 8, 2008, which is hereby incorporated by reference herein in its entirety.

What is claimed is:

1. A brushless DC motor configured to drive a driven member, said brushless DC motor comprising:

a rotor having a magnet;
a stator having a coil configured to provide a rotational force to the magnet;
a position detector configured to output a first signal that is periodic, in accordance with a rotating position of the rotor;
a signal generator configured to generate a second signal by adding a lead angle to a phase of the first signal output from the position detector;
an excitation switch configured to select an excitation to the coil in accordance with the second signal; and
a phase change part configured to change the lead angle in accordance with at least one of a position and a moving direction of the driven member.

2. The brushless DC motor according to claim 1, wherein the position detector includes a first position detector configured to generate the first signal that has a sine wave shape, and a second detector configured to generate the first signal having a cosine wave shape, and
wherein the signal generator includes:
a first inverting amplifier connected to the first position detector and configured to amplify an output of the first position detector by −A times;
a second inverting amplifier connected to an output of the first inverting amplifier and configured to amplify the output of the first inverting amplifier by −1 times;
a third inverting amplifier connected to the second position detector and configured to amplify an output of the second position detector by −A times;
a fourth inverting amplifier connected to an output of the third inverting amplifier and configured to amplify the output of the third inverting amplifier by −1 times;
a fifth inverting amplifier configured to add an output of the second inverting amplifier amplified by $\cos \alpha$ times to an output of the fourth inverting amplifier amplified by $\sin \alpha$ times; and
a sixth inverting amplifier configured to add the output of the first inverting amplifier amplified by $\sin \alpha$ times to the output of the fourth inverting amplifier amplified by $\cos \alpha$ times, $\alpha$ being the lead angle.

3. The brushless DC motor according to claim 1, wherein the phase change part includes:
a memory configured to store a relationship between at least one of the position and the moving direction of the driven member and the load used to drive the driven member, and a relationship between the load, a target speed for driving the driven member, and a plurality of lead angles; and
a selector configured to select one of the plurality of lead angles which is closest to the target speed to the load corresponding to the at least one.

4. A brushless DC motor configured to drive a driven member, said brushless DC motor comprising:
a rotor having a magnet;
a stator having a coil configured to provide a rotational force to the magnet;
a position detector configured to output a first signal that is periodic, in accordance with a rotating position of the rotor;
a signal generator configured to generate a second signal by adding a lead angle to a phase of the first signal output from the position detector;
an excitation switch configured to select an excitation to the coil in accordance with the second signal; and
a phase change part configured to change the lead angle in accordance with a load used to drive the driven member.

5. An image pickup apparatus comprising:
a lens as a driven member; and
a brushless DC motor according to claim 1 configured to drive the driven member.

* * * * *